March 26, 1957 H. A. SHERWOOD 2,786,893

SOUND RECORDING AND REPRODUCING APPARATUS

Filed June 22, 1955 3 Sheets-Sheet 1

INVENTOR.
Henry A. Sherwood
BY
Munn, Liddy, Nathanson & March
ATTORNEYS

March 26, 1957 H. A. SHERWOOD 2,786,893

SOUND RECORDING AND REPRODUCING APPARATUS

Filed June 22, 1955 3 Sheets-Sheet 2

INVENTOR.
Henry A. Sherwood
BY
Munn, Liddy, Nathanson & March
ATTORNEYS

SOUND RECORDING AND REPRODUCING APPARATUS

Filed June 22, 1955 3 Sheets-Sheet 3

INVENTOR.
Henry A. Sherwood
BY
Munn, Liddy, Nathanson & March
ATTORNEYS

United States Patent Office 2,786,893
Patented Mar. 26, 1957

2,786,893

SOUND RECORDING AND REPRODUCING APPARATUS

Henry A. Sherwood, Woodbridge, Conn.

Application June 22, 1955, Serial No. 517,261

21 Claims. (Cl. 179—100.1)

This invention relates to sound recording and reproducing machines, and more particularly to dictating machines of the type using record discs, such as are commonly employed in business and commercial houses and the like.

Machines of this type, while appearing relatively small and compact, are still of such a size that they may not be readily transported, as, for example, in an attaché case, nor readily stored in many places, as, for example, a desk drawer. Normally, the height of such machines prevents them from being carried in a thin carrying case such as an attaché case, and if placed in a desk drawer, prevents the drawer from being closed. This is a distinct disadvantage since often it would be convenient to transport the machine from place to place on business trips or the like, as well as being convenient to place the dictating equipment in, for example, a side desk drawer, close the drawer when the equipment is not in use and pull out the drawer only when the dictation is to be given.

The above disadvantage of existing dictating machines is obviated by the present invention, and an object of the invention is to provide an improved dictating machine of the type employing a record disc, which is small and compact, and in its physical dimensions especially low in height whereby it may readily fit into small spaces, as for example an attaché case or the drawer of a desk.

Another object of the invention is to provide an improved dictating machine in accordance with the above, wherein a portion of the machine comprising the record drive and recording-reproducing head or mechanism may be constituted of part of an existing machine already on the market.

A further object of the invention is to provide a novel and improved adapter structure for use with an existing record drive and recording-reproducing mechanism, said adapter structure comprising a thin, expansive base member on which the said record mechanism may be mounted, and comprising further a motor, transmission unit therefor, amplifier and speaker all carried closely adjacent each other on a marginal portion of the base member and arranged to occupy a small space alongside of the record mechanism, with the transmission engageable with said record drive for transmitting movement thereto.

Still another object of the invention is to provide a novel, unitary motor drive, amplifier and speaker unit constituting a compact organization adapted to occupy space alongside of a record and recording-reproducing mechanism, and to cooperate therewith in the desired manner.

A feature of the invention resides in the provision of a novel motor and transmission unit for use in conjunction with a record drive, which enables the latter to be readily quickly separated from and subsequently reassembled to the motor and transmission when this is found necessary.

Still another feature of the present invention resides in the provision of a novel self-energizing drive by means of which the recording disc is driven.

Other features and advantages will hereinafter appear.

Figures 1, 2, 4:
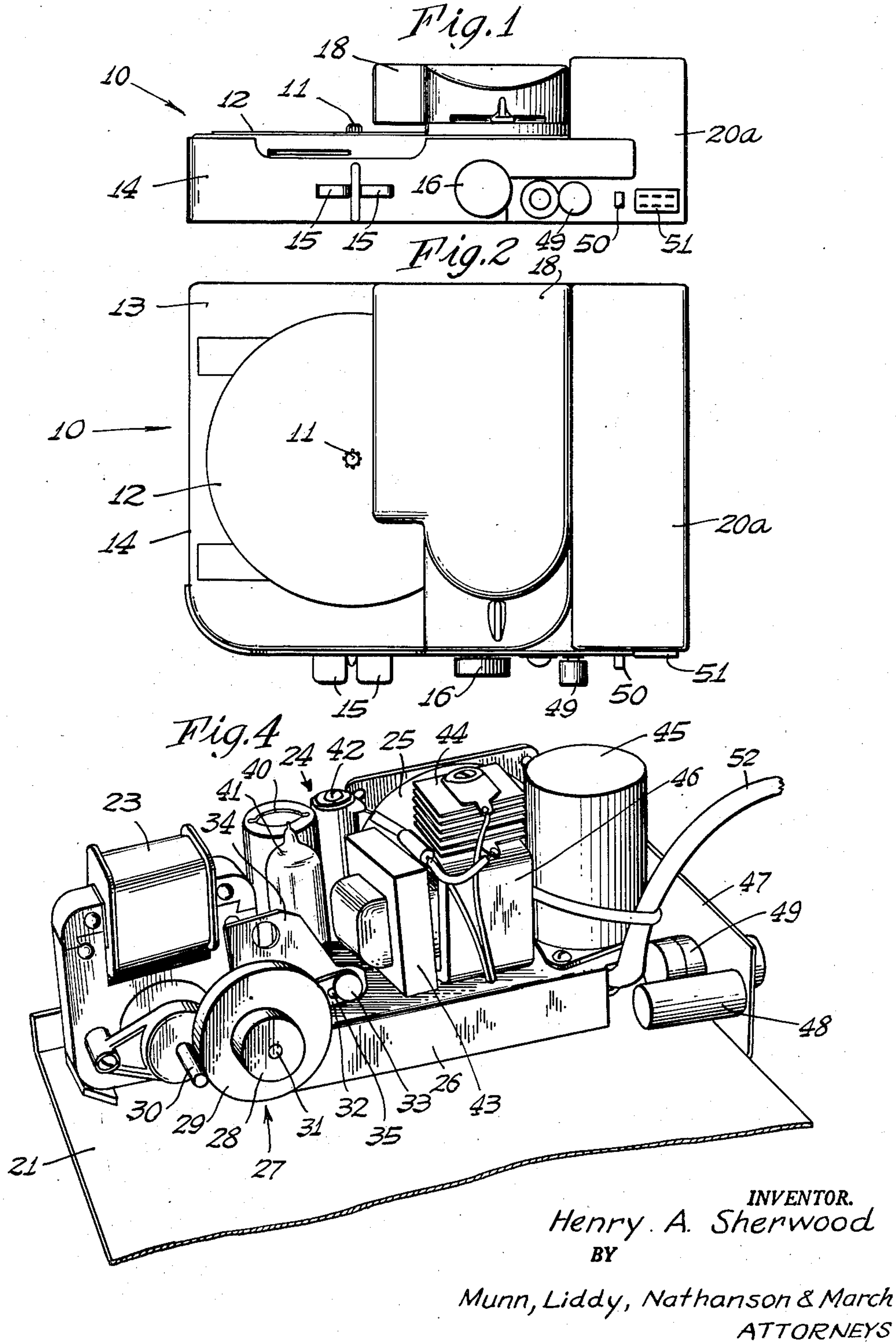
Fig. 1 is a front elevational view of dictation equipment made in accordance with the invention.
Fig. 2 is a top or plan view of the equipment shown in Fig. 1.
Fig. 4 is a fragmentary perspective view of the left side of the adapter shown in Fig. 3.
Figures 3, 5:
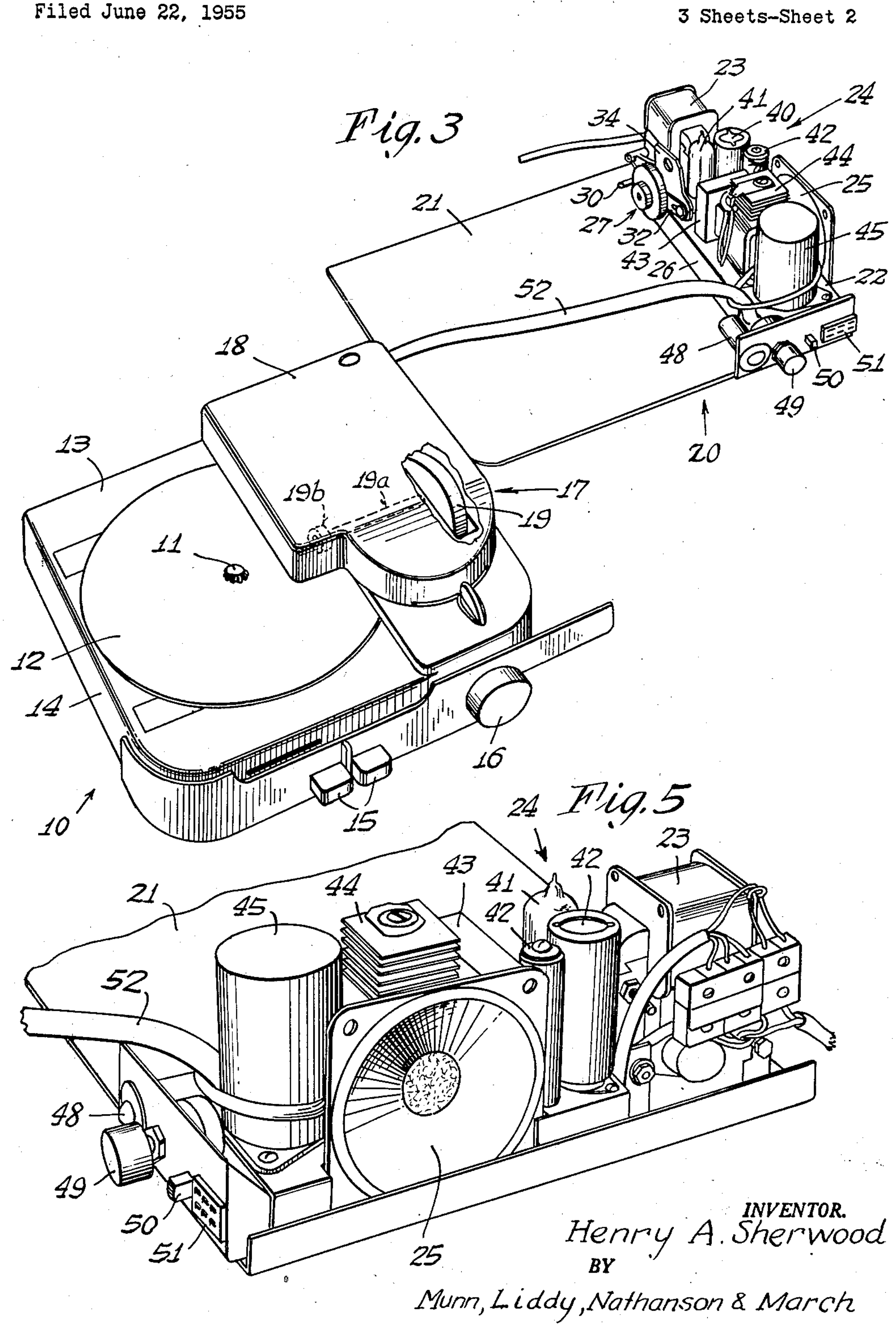
Fig. 3 is a front perspective view of the dictation equipment of Fig. 1 partially dismantled and with an enclosure or housing part removed, this figure showing the adapter unit for use with a portion of an existing dictating machine.
Fig. 5 is a perspective view of the adapter of Fig. 4, taken from the right side.

Referring to Figs. 1 and 3 the dictating machine shown therein comprises a record drive and recording-reproducing unit which is indicated generally by the numeral 10, said unit mainly constituting a part of an existing dictating machine found on the market at the present time. The unit 10 has a spindle 11 adapted to rotatably mount a record 12 which overlies the table surface 13 of a generally rectangular housing and frame 14. At the front of the housing 14 controls 15 and 16 may be provided.

On the housing 14 a record drive mechanism 17 is provided, enclosed by a cover plate 18. The drive mechanism 17 comprises a drive wheel 19 of relatively large diameter, having its axis horizontal, said wheel being carried by a shaft *19a* extending from the wheel to the left and under the record 12 and having a friction wheel *19b* engaging the underside of the record to enable a drive to be had therewith.

As shown in Fig. 3 I provide a novel adapter unit 20 in conjunction with the record drive and recording-reproducing unit 10, to complement the latter. The adapter unit 20 provides a base for the unit 10 and also has motive means for driving the record through the medium of the wheel 19, and an amplifier and speaker for connection with the recording-reproducing head of the unit 10.

The adapter 20 has a thin, flat, base member 21 arranged to underlie the unit 10 and support the latter, said member having a marginal portion 22 which is arranged to project an appreciable amount from the right side of the unit 10. On the marginal portion 22 there is an enclosure *20a*, Figs. 1 and 2, and within the enclosure there is mounted a drive motor 23, an amplifier unit 24 and a speaker 25 in closely juxtaposed positions. The motor 23 is carried directly by the base member 21, and the amplifier unit 24 is mounted on a chassis 26 which is in turn secured to the base member.

Referring to Fig. 4, in accordance with the present invention I provide a novel transmission, in conjunction with the motor 23 and record unit 10, by which the record 12 is slowly rotated for the purpose of recording or reproducing. This transmission comprises an idler friction wheel 27 having a small diameter portion 28 and a large diameter portion 29, the latter engaging the drive shaft 30 of the motor 23.

The friction wheel 27 is mounted to have a limited universal movement edgewise, being carried on a shaft 31 supported by an arm 32 which is arranged to swing about a pivot 33 fixedly secured to a bracket 34 rigid with the base member 21. The arm 32 and bracket 34 have relatively large, co-engaging surfaces to impart stability to the arm during its slight movement on the pivot 33. The arm 32 also has a slot 35 through which the pivot pin 33 extends, said slot enabling the arm to have limited longitudinal movement.

Figure 6:
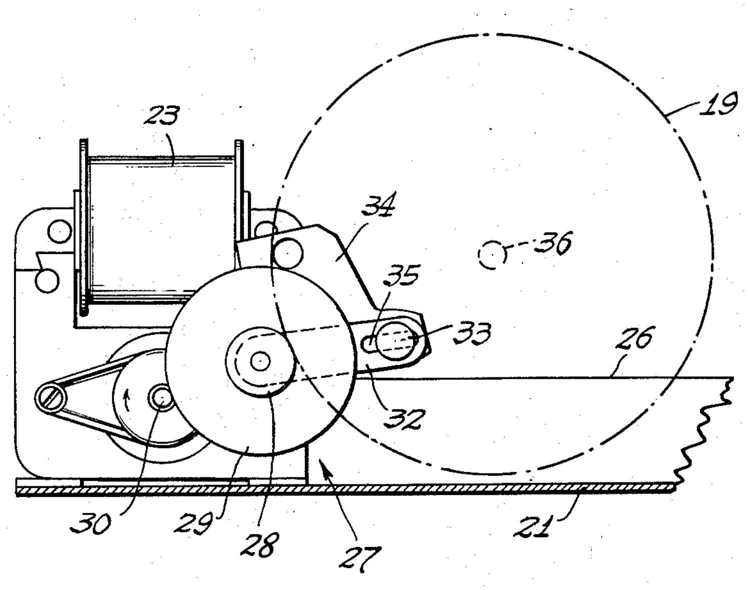
Fig. 6 is a fragmentary inside elevational view of the motive means and transmission therefor. This figure also shows in broken outline the position of a driven wheel of the record drive mechanism.

As shown in Figs. 3 and 6, the record unit 10 is so arranged that the driven wheel 19 thereof may engage the small-diameter portion 28 of the friction wheel 27 when the adapter 20 is in assembled relation with respect to the unit. When the parts 19, 28, 29, and 30 are in engagement, the axis of the driven wheel 19, indicated at 36, is slightly out of alinement with the plane which contains both the motor drive shaft 30 and the jack shaft 31 carried by the arm 32. By virtue of the floating mounting of the jack shaft 31, however, as effected by the arm 32, a self-energizing drive is established. The friction wheel 27 is normally disposed upwardly and out of engagement with the wheel 19 and the motor drive shaft 30. Whenever the driven wheel 19 is loaded, imposing a load on the transmission comprising the idler friction wheel 27, the latter will tend to become more tightly engaged with the wheel 19 and motor drive shaft 30, by moving downward, thus providing the self-energizing type of drive. The present drive is of particular advantage in that it enables the adapter unit 20 to be readily separated from the record unit 10 without removing belts, connecting shafts, wheels, etc., and thus there is facilitated the assembly and disassembly of the equipment. This is an important feature of the invention.

As shown in Fig. 4 the amplifier 24 comprises the chassis 26, vacuum tubes 40 and 41, a resistor 42, an output transformer 43, a dry rectifier 44 and a filter condenser 45 all arranged in close proximity to each other, in the manner shown. The speaker 25 has a driving unit 46 disposed above the chassis 26 and over which the rectifier 44 is mounted.

At the front of the adapter unit 20 a panel 47 is mounted, having a signal lamp 48, volume control 49, switch 50 and electric receptacle 51. From the chassis 26 a multiple-conductor cable 52 extends, said cable leading to the record unit 10 and providing for connection between the amplifier 24, signal light 48, and recording-reproducing head in the unit 10.

It will be seen that with the above structure I have provided a novel and advantageous dictating machine structure which is relatively small and compact corresponding substantially in length and width to letter size paper or the standard size of a photograph. As regards its physical dimensions the structure is characterized by relatively small height whereby it may be readily accommodated in restricted spaces, as for example an attaché case, the drawer of a desk or the like. The structure may be constituted as a unitary device complete in and of itself, or it may be constituted of the two basic units as shown in Fig. 3, the record unit 10 having the drive and recording-reproducing device, and the adapter unit 20 comprising the thin flat base member 21, motive means 23, amplifier 24 and speaker 25, the said components being disposed on a marginal portion of the base member 21 so as to extend along the right side of the record unit 10. In the event that the equipment is constituted of the two basic units mentioned above, said units may be readily separated a distance from each other by virtue of the provision of the connecting cable 52 and the novel organization comprising the friction wheel transmission which is energized from the motor 23.

The adapter unit 20 is characterized by a novel, small and compact arrangement of the motor, amplifier and speaker units, by which a minimum amount of space is needed, reducing the overall height and size of the equipment.

Figure 7:
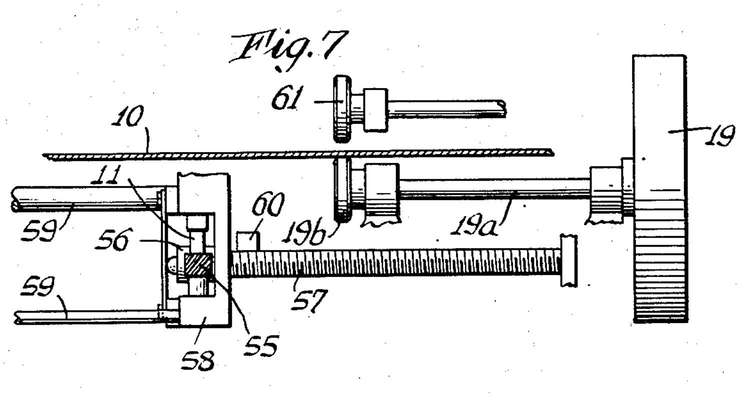
Fig. 7 is a vertical sectional view of the record drive and recording-reproducing unit showing the transmission mechanism by which the record is turned.

In conjunction with a novel self-energizing drive associated with the driven wheel 19, I provide an additional transmission mechanism by which the record disk 12 is turned at a variable speed as the dictation progresses. Referring to Fig. 7, the shaft $19a$ carrying the wheel 19 and the friction wheel $19b$ extends under the record disk, with the wheel $19b$ engaging the underside of the disk. The spindle 11 on which the disk 10 is mounted, is provided with a bevel gear 55 meshing with the gear 56 carried by a long screw 57 extending parallel to the shaft $19a$. The spindle 11 is mounted in a carriage 58 riding on bars 59 by which the spindle may be shifted sidewise toward the driven wheel 19. Cooperable with the screw 57 is a half-nut 60, which may be moved out of engagement with the screw when desired. When the spindle 11 is turned by virtue of the disk 10 being driven, the screw 57 will turn and, due to the half-nut 60, will cause an advance of the carriage 58 from left to right. Thus the spindle 11 will be shifted from left to right causing the friction drive wheel $19b$ to engage the underside of the disk 10 in a spiral path approaching the center of the disk as the latter turns. Hence, since the friction wheel $19b$ has a constant speed, it will cause the record disk 10 to increase its speed as the spindle 11 moves from left to right. Above the disk 10 a friction wheel 61 is mounted and arranged to engage or disengage the disk to render operative or inoperative the friction drive to the disk.

While the invention has been described in some detail, it will be understood that variations and modifications may be made without departing from the spirit of the invention or the scope of the appended claims.

I claim:

1. A unitary motive, amplifier and base assemblage for use with a record disk drive and recording-reproducing mechanism of a dictating machine, comprising a relatively thin, flat expansive member arranged to underlie the said mechanism and constitute a base therefor, said member having a marginal portion adapted to extend beyond said mechanism; motive means carried by said marginal portion of the base member, including a transmission operated by said motive means for actuating said record disk drive; an amplifier disposed on said marginal portion adjacent said motive means, including a speaker; means for connecting said amplifier to the recording-reproducing part of said mechanism; and an enclosure fastened to said marginal portion of the base member and enclosing the said motive means, amplifier and speaker.

2. The invention as defined in claim 1 in which there are controls for said amplifier, disposed at one end of said marginal portion.

3. The invention as defined in claim 1 in which the transmission comprises a shaft extending over said base member from the motive means, and comprises a stepped rubber friction wheel disposed over the base member and engaging said shaft.

4. A unitary motive, amplifier and base assemblage for use with a record disk drive and recording-reproducing mechanism of a dictating machine, comprising an elongate, low base adapted to be secured to one side of said mechanism; motive means carried by said base, including a transmission operated by said motive means for actuating said record disk drive; an amplifier disposed on said base adjacent said motive means, including a speaker; means for connecting said amplifier to the recording-reproducing part of said mechanism; and an enclosure fastened to said base and enclosing the said motive means, amplifier and speaker.

5. The invention as defined in claim 4 in which the transmission comprises a shaft extending from the motive means and a stepped rubber friction wheel having a large-diameter portion engaging said shaft.

6. The invention as defined in claim 5 in which there is means mounting said friction wheel for limited edgewise movement toward and away from said shaft, and for limited edgewise movement circumferentially of the shaft.

7. In a dictating machine, a drive mechanism comprising two subassemblies adapted to be readily separated or assembled to each other, said mechanism having a frame; a relatively large driven wheel carried by said frame and means associated therewith for driving a record disc; a base member; a motor mounted on said base member, having a drive shaft; an idler friction wheel having large- and small-diameter portions; a shaft carrying said friction wheel; an arm mounting said shaft; a pivotal connection between the arm and the base member, providing for pivotal movement and limited longitudinal movement of the arm, the large-diameter portion of the friction wheel engaging the drive shaft of the motor and the small-diameter portion of the friction wheel engaging the said large driven wheel, said motor drive shaft and friction wheel shaft being slightly out-of-line with respect to the axis of the said driven wheel and said pivotal connection enabling the friction wheel shaft to approach alinement with the drive shaft and said axis, thereby to provide a self-energizing drive; and means releasably mounting the frame on the base member, said friction wheel separating from the driven wheel when the frame is removed from the base member.

8. In a dictating machine, a drive mechanism comprising two subassemblies adapted to be readily separated or assembled to each other, said mechanism having a frame; a relatively large driven wheel carried by said frame and means associated therewith for driving a record disc; a base member; a motor mounted on said base member, having a drive shaft; an idler friction wheel having large- and small-diameter portions; means carrying said friction wheel, providing for limited universal movement thereof in edgewise directions, the large-diameter portion of the friction wheel engaging the drive shaft of the motor and the small-diameter portion of the friction wheel engaging the said large driven wheel, said motor drive shaft and friction wheel shaft being slightly out-of-line with respect to the axis of the said driven wheel and said wheel-carrying means enabling the friction wheel shaft to approach alinement with the drive shaft and said axis, thereby to provide a self-energizing drive; and means releasably mounting the frame on the base member, said friction wheel separating from the driven wheel when the frame is removed from the base member.

9. A dictating machine constituted of two separate and distinct units adapted to interfit with each other and together form a functionally unitary device, comprising a low housing; means including a drive in said housing, for turning a record disc; a recording and reproducing mechanism in said housing, cooperable with said record disc; a thin, wafer-like relatively large base member arranged to underlie and be secured to said housing and constitute a base therefor, said base member having a marginal portion adapted to project laterally beyond the housing; an enclosure secured to, disposed above and carried by the marginal portion of the base member, said enclosure forming with said portion a closed space; a motor in said enclosure; transmission means carried by said base member and energized from said motor, engageable with the drive in the housing for transmitting movement thereto; an amplifier and a speaker therefor, disposed on the base member within said enclosure; and connections between said amplifier and the recording and reproducing mechanism in said housing.

10. A dictating machine constituted of two separate and distinct units adapted to interfit with each other and together form a functionally unitary device, comprising a low housing; means on said housing, for mounting a record disc for turning movement; a thin, wafer-like, relatively large base member arranged to underlie and be secured to said housing and constitute a base therefor, said base member having a marginal portion adapted to project laterally beyond the housing; an enclosure secured to, disposed above and carried by the marginal portion of the base member, said enclosure forming with said portion a closed space; a motor in said enclosure; and transmission means carried by said base member and energized from said motor, for transmitting movement into said housing.

11. A dictating machine constituted of two separate and distinct units adapted to interfit with each other and together form a functionally unitary device, comprising a low housing; means on said housing, for mounting a record disc; a recording and reproducing mechanism in said housing, cooperable with said record disc; a thin, wafer-like, relatively large base member arranged to underlie and be secured to said housing and constitute a base therefor, said base member having a marginal portion adapted to project laterally beyond the housing; an enclosure secured to, disposed above and carried by the marginal portion of the base member, said enclosure forming with said portion a closed space; an amplifier and a speaker therefor, disposed on the base member in said enclosure; and connections between said amplifier and the recording and reproducing mechanism in said housing.

12. A dictating machine constituted of two separate and distinct units adapted to interfit with each other and together form a functionally unitary device, comprising a low housing having a base provided with a thin, wafer-like marginal portion projecting from a side of the housing; means including a drive in said housing, for turning a record disc; a recording and reproducing mechanism in said housing, cooperable with said record disc; an enclosure secured to, and disposed above and carried by the marginal portion of the base, said enclosure forming with said portion a closed space; a motor in said enclosure; transmission means carried by said base member and energized from said motor, engageable with the drive in the housing for transmitting movement thereto; an amplifier and a speaker therefor, disposed on the base in said enclosure; and connections between said amplifier and the recording and reproducing mechanism in said housing.

13. A dictating machine constituted of two separate and distinct units adapted to interfit with each other and together form a functionally unitary device, comprising a low housing having a base provided with a thin, wafer-like marginal portion projecting from a side of the housing; means including a drive in said housing, for turning a record disc; an enclosure secured to, disposed above and carried by the marginal portion of the base; a motor in said enclosure; and transmission means carried by said base member and energized from said motor, engageable with the drive in the housing for transmitting movement thereto.

14. A dictating machine constituted of two separate and distinct units adapted to interfit with each other and together form a functionally unitary device, comprising a low housing having a base provided with a thin, wafer-like marginal portion projecting from a side of the housing; means on said housing, for mounting a record disk for turning movement; a recording and reproducing mechanism in said housing, cooperable with said record disc; an enclosure secured to, disposed above and carried by the marginal portion of the base; an amplifier and a speaker therefor, disposed on the base in said enclosure; and connections between said amplifier and the recording and reproducing mechanism in said housnig.

15. A unitary drive, amplifier and speaker assemblage for a dictating machine, comprising a base member; a motor mounted on the base member, having a projecting drive shaft; an idler friction wheel; a shaft carrying said friction wheel, mounted on the base for lateral movement, said friction wheel engaging the motor shaft and being movable toward and away therefrom; an amplifier chassis mounted on the base member; a loud speaker rigid on said base member; and amplifier components carried by said chassis and disposed, in conjunction with the motor and speaker, to constitute an elongate assembly having a relatively narrow width and greater length than height, said motor shaft and friction wheel projecting from a side of said assembly.

16. A unitary drive, amplifier and speaker assemblage for a dictating machine, comprising a base member; a motor mounted on the base member, having a projecting drive shaft; an idler friction wheel; a shaft carying said friction wheel, mounted on the base for lateral movement, said friction wheel engaging the motor shaft and being movable toward and away therefrom; a loud speaker rigid on said base member; and amplifier components carried by said base member and disposed, in conjunction with the motor and speaker to constitute an elongate assembly having a relatively narrow width and greater length than height, said motor shaft and friction wheel projecting from a side of said assembly.

17. In a dictating machine, a unitary assemblage complete in and of itself, comprising, in combination, means engageable with a record disc, for turning the latter; a transmission connected with said disc-turning means and extending laterally therefrom for imparting motion thereto; and a second assemblage complete in and of itself and adapted to interfit with the first assemblage, comprising motive means disposed laterally of said transmission for applying power to the latter, said motive means, transmission and disc-turning means being disposed at a common level in side-by-side relation.

18. A unitary drive and amplifier assemblage complete in and of itself, and adapted for use in a dictating machine, comprising a motive means; a sound amplifier including a speaker disposed laterally and alongside of the motive means, said motive means and amplifier being so organized and arranged as to occupy substantially a rectangular space.

19. The invention as defined in claim 18 in which there is a transmission mechanism including a force-transmitting shaft driven by said motive means and extending laterally from said assemblage at an angle of substantially ninety degrees.

20. The invention as defined in claim 19 in which the amplifier, motive means and shaft are arranged generally in the configuration of the letter T.

21. In a dictating machine, a drive mechanism comprising means engageable with a record disc for turning the same; a friction wheel connected with said means; a motor, having a driving wheel; an intermediate rotatable friction member engageable with the friction wheel and driving wheel, the axis of said member being disposed out-of-line with respect to said wheels; and means rotatably mounting said friction member, enabling the axis of the latter to approach alignment with the driving wheel and friction wheel, thereby to provide a self-energizing drive.

References Cited in the file of this patent

UNITED STATES PATENTS 2,485,381 Hornor ---------------- Oct. 18, 1949

2,497,037 Somers ---------------- Feb. 7, 1950